United States Patent Office.

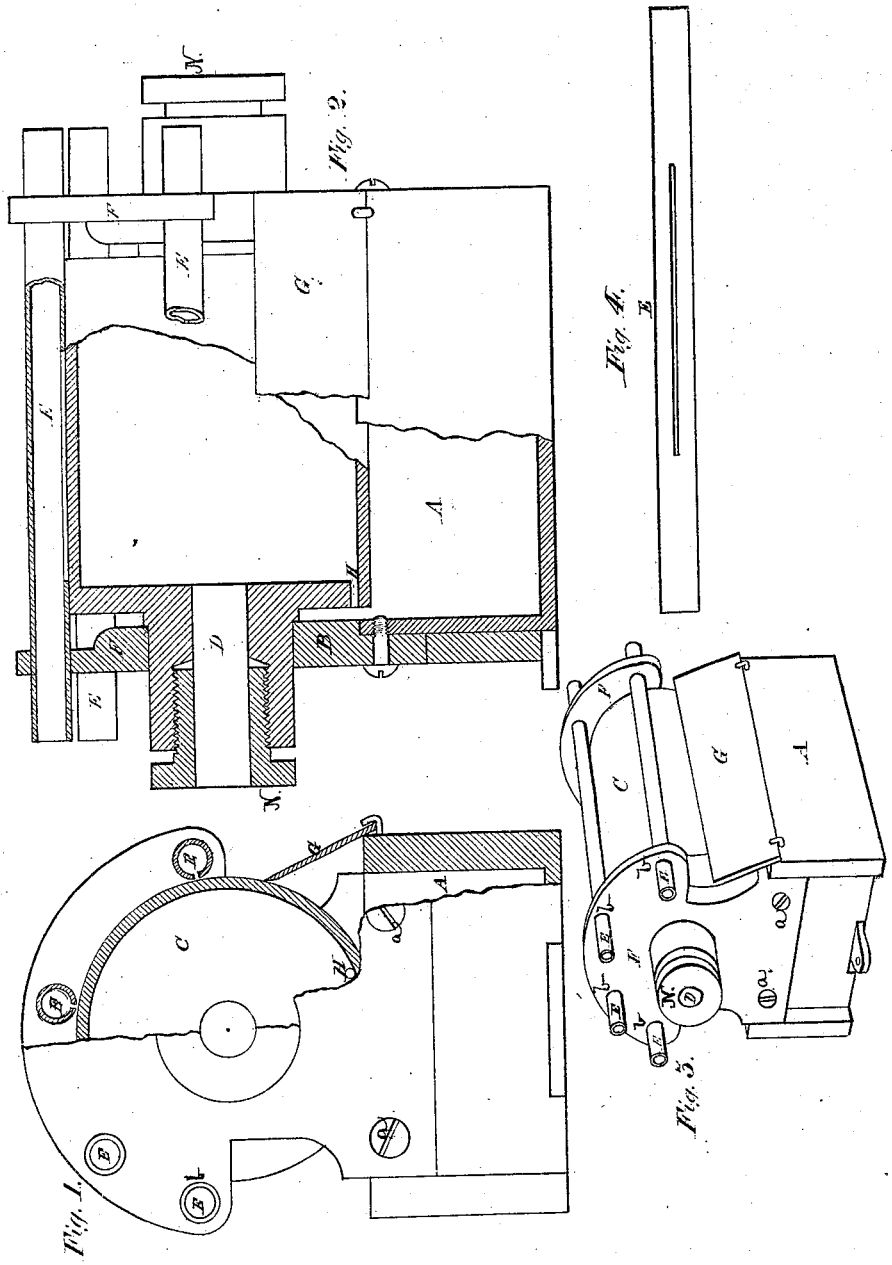

SAMUEL D. GILSON, OF SYRACUSE, NEW YORK.

Letters Patent No. 108,701, dated October 25, 1870.

IMPROVEMENT IN EVAPORATING APPARATUS.

The Schedule referred to in these Letters Patent and making part of the same.

*To all whom it may concern:*

Be it known that I, SAMUEL D. GILSON, of the city of Syracuse, county of Onondaga and State of New York, have invented a new and useful Improvement in Evaporators; and I do hereby declare the following is a full, clear, and sufficient description of the same so as to enable any one skilled in the art to make, construct, and use the same, reference being had to the annexed drawing forming a part of this specification, in which drawing—

Figure 1 is an end view, partly in section, of the device, illustrative of my invention.

Figure 2 is a side view thereof, partly in section.

Figure 3 is a perspective view.

Figure 4 is a view of one of the dipping-pipes, to be hereinafter referred to.

Similar letters of reference indicate corresponding parts in the several figures.

Nature and Object of this Invention.

Heretofore, the most successful method for making salt has been to evaporate the brine either in a series of kettles or shallow reservoir by solar evaporation. This is the most economical and best method at present in use, but is uncertain in its results as to time, it being wholly dependent upon the dry state of the atmosphere. The boiling process or method is to some extent more certain in its results, but is unreliable, not removing the impurities that exist in the brine, and which, by overheating, forms incrustations upon the kettles, which, owing to the difficulty experienced in removing the same, cause great delay, labor, and expenditure of heat, thus increasing the cost of fuel and waste of salt by such incrustation.

To overcome the uncertainty of the solar and the imperfections of the present artificial method, is the object of my invention ; and, to this end, My invention consists—

First, in a rotary evaporating steam-cylinder, revolving in or over a suitable reservoir;

Second, forming an aperture in the cylinder for the purpose of discharging condensed steam;

Third, locating above or providing the rotating cylinder or cylinders with dripping-pipes;

Fourth, the employment of a knife or scraper, movable or stationary, for scraping off any substance that may adhere to the cylinder; and Fifth, the general combination of a rotating cylinder or steam-chamber with a reservoir and scraper or knife, all of which will hereinafter more fully be described.

I prepare a steam-boiler of desired capacity, and connect the same with a steam-chamber or cylinder, either dressed or undressed, which rotates, or is otherwise partly immersed. This chamber is provided with dripping-pipes, to further economize the heat, thus uniting both the solar and artificial mode of evaporation.

In this connection I employ a scraper or knife, or any other suitable device, which acts upon the periphery of the hollow steam-chamber or cylinder, to cleanse off the residuum from the evaporating surface dry, or otherwise, as desired.

One or more hollow steam-chambers or cylinders may be used. The first series may be heated with the escaping steam or heat escaping from the fire-flue, or both the escaping steam from the principal cylinders and heat from the fire flue.

By this method the brine is partially evaporated by the first cylinder or cylinders sufficient to precipitate the lime, magnesia, and other impurities, while the scrapers or knives remove all impurities that adhere to the surface of the steam-heated cylinders, in sufficient quantities to precipitate them to the bottom of the evaporating-pan or reservoir. Then above all this sediment the brine may be drawn to the second series of chambers or cylinders, where the evaporation may be completed, and the dry salt or other residuum of liquids may be removed from the surface by scraping with a knife or other suitable device, and thus complete the manufacture of salt, without overheating or incrustation, thus removing all impurities now more or less contained in the manufacture of salt.

General Description.

In the drawing—

A may represent an evaporating-pan;

C, the hollow cylinder;

M M, the stuffing-boxes;

D, the steam-passages;

H, openings in the cylinder;

E E, the dripping-pipes;

F F, brackets supporting the pipes and hollow cylinder; and

G, the movable or stationary scraper or knife.

A is the evaporating-pan or reservoir, formed of suitable material, and is made preferably of a square formation, and so arranged as to admit the ingress of brine or other liquid to be manufactured.

Formed with this evaporating-pan or reservoir, or firmly secured to it by bolts or screws, $a\ a\ a\ a$, are brackets or pedestals, F, which are provided with openings, $b\ b$, forming bearings for the journals of the hollow steam-cylinder C, hereinafter mentioned.

$b\ b$ represent a series of openings formed in the top part of the bracket or pedestals F, which form bearings or supports for a series of dripping-pipes, E E E E.

The part of the bracket or pedestal forming the bearings for the journals of the hollow steam-cylinder is made much stouter than the top part supporting the dripping-pipes, so as to reliably sustain the cylinder C.

C is a hollow metallic cylinder, formed with journals having their bearings in the bracket or pedestal F, and which rotates in or over the reservoir or evaporating-pan A.

The journals formed with the hollow cylinder are provided with screw-threads at either end, so as to receive stuffing-boxes N N, which are likewise provided with screw-threads, and operate together as a male and female screw.

D is a passage formed in the stuffing-boxes and journals of the cylinder, so as to allow steam to pass from a steam-boiler into or through the hollow cylinder C. This cylinder C rotates upon its journals in or over the reservoir or evaporating-pan A, and is formed or provided with an opening or outlet, H, for the purpose of discharging the water collected therein owing to condensation of the steam.

E E E are hollow dripping-pipes, formed with a suitable slot or opening extending more or less the entire length of the pipes, fully shown in fig. 4. These pipes have their bearings in the bracket or pedestal F, and are arranged around the top part or surface of the hollow steam-cylinder, out of immediate contact with said cylinder, in such a manner as to drip the liquid from a reservoir evenly, and at proper distances upon the rotating evaporating-cylinder C.

G is a movable or stationary knife or scraper, one or more in number, as may be desired, arranged in an inclined position, its edge bearing upon the circumference or periphery of the revolving cylinder, and is designed to scrape from the surface of the said cylinder whatever substance may be collected thereon.

This knife or scraper may either be formed with the evaporating-pan, attached to it by screws or bolts, or may be hinged or hung loosely upon arms, $p\ p$, formed or otherwise secured to the sides or framing of the pan.

Having thus described my invention,

What I claim as new, and desire to secure by Letters Patent, is—

1. The hollow dripping-pipes, formed with a slot or opening, and operating substantially as described.

2. The hollow rotary evaporating steam-chamber or cylinder, provided with an opening, H, for the passage of condensed steam, substantially as described, for the purpose set forth.

3. A hollow rotary steam-evaporating cylinder, in combination with an evaporating-pan or reservoir, substantially as described.

4. The combination of a knife or scraper with a dressed or undressed revolving steam-cylinder, substantially as set forth.

5. The dripping-pipes E E, steam-chamber or cylinder C, in combination with the evaporating-pan or reservoir A and the knife G, substantially as described.

The above signed by me this 11th day of May, 1870.

SAM. D. GILSON.

Witnesses:
J. A. NOTTINGHAM,
SIMEON LUCE.